United States Patent [19]

Brodersen et al.

[11] Patent Number: 4,856,763
[45] Date of Patent: Aug. 15, 1989

[54] MECHANICAL SEAT SUSPENSION WITH CONCENTRIC CAM SURFACES

[75] Inventors: Cole T. Brodersen, Davenport; Danny S. Foster, Bluegrass, both of Iowa

[73] Assignee: Sears Manufacturing Company, Davenport, Iowa

[21] Appl. No.: 195,793

[22] Filed: May 19, 1988

[51] Int. Cl.[4] .................. A47C 7/14; F16M 13/00; B60N 1/02
[52] U.S. Cl. .................. 267/131; 248/564; 248/588; 297/347
[58] Field of Search .................. 267/131, 182, 142; 248/588, 564, 525, 550, 566; 297/348, 347; 108/145

[56] References Cited

U.S. PATENT DOCUMENTS

| | | | |
|---|---|---|---|
| 3,339,906 | 9/1965 | Persson | 267/131 |
| 3,390,857 | 6/1966 | Nystrom | 248/564 |
| 3,599,232 | 8/1971 | Tabor | 248/567 |
| 3,826,457 | 7/1974 | Longchamp | 248/421 |
| 3,917,211 | 11/1975 | Daunderer et al. | 248/421 |
| 4,093,197 | 6/1978 | Carter et al. | 267/131 |
| 4,125,242 | 11/1978 | Meiller et al. | 248/525 |
| 4,158,160 | 6/1979 | Meiller | 318/467 |
| 4,183,492 | 1/1980 | Meiller | 248/395 |
| 4,364,605 | 12/1982 | Meiller | 297/306 |
| 4,382,573 | 5/1983 | Aondetto | 248/564 X |
| 4,461,444 | 7/1984 | Grassl et al. | 248/550 |
| 4,471,934 | 9/1984 | Meiller et al. | 267/177 |
| 4,558,648 | 12/1985 | Franklin et al. | 248/588 X |

FOREIGN PATENT DOCUMENTS

| | | |
|---|---|---|
| 1916403 | 3/1969 | Fed. Rep. of Germany . |
| 2446515 | 4/1976 | Fed. Rep. of Germany . |
| 2446516 | 4/1976 | Fed. Rep. of Germany . |
| 3227858 | 1/1984 | Fed. Rep. of Germany . |
| 2286022 | 4/1976 | France . |
| 846161 | 8/1960 | United Kingdom . |
| 930903 | 7/1963 | United Kingdom . |
| 965072 | 7/1964 | United Kingdom . |
| 1278921 | 6/1972 | United Kingdom . |
| 1491291 | 11/1977 | United Kingdom . |
| 1491292 | 11/1977 | United Kingdom . |

Primary Examiner—Robert J. Oberleitner
Attorney, Agent, or Firm—Niro, Scavone, Haller & Niro, Ltd.

[57] ABSTRACT

A mechanical seat suspension inside a housing includes parallel scissor arms and a support arm with a cam connected to suspension springs. The support arm, which carries the substantial majority of the seat load, has a height adjustment assembly and a cam with two arcuate surfaces that define an imaginary pivot point. The use of the cam with the imaginary pivot point permits a more compact structure. A shock absorber attached to the outside of the scissor arms dampens the stroke of the suspension springs connected to the cam. The ratio of the shock stroke travel to the vertical movement of the seat remains generally linear and constant, thus producing a more comfortable rids. Also included is a height adjustment mechanism on the support arm that interlocks with the cam by a pivoting pawl and biasing spring. The height of the seat is adjusted by the relative movement of the top portion of the housing to the lower portion. No external levers, triggers, or other structures are necessary for seat adjustment. The tension in the suspension springs is adjustable to compensate for the weight of the rider.

12 Claims, 7 Drawing Sheets

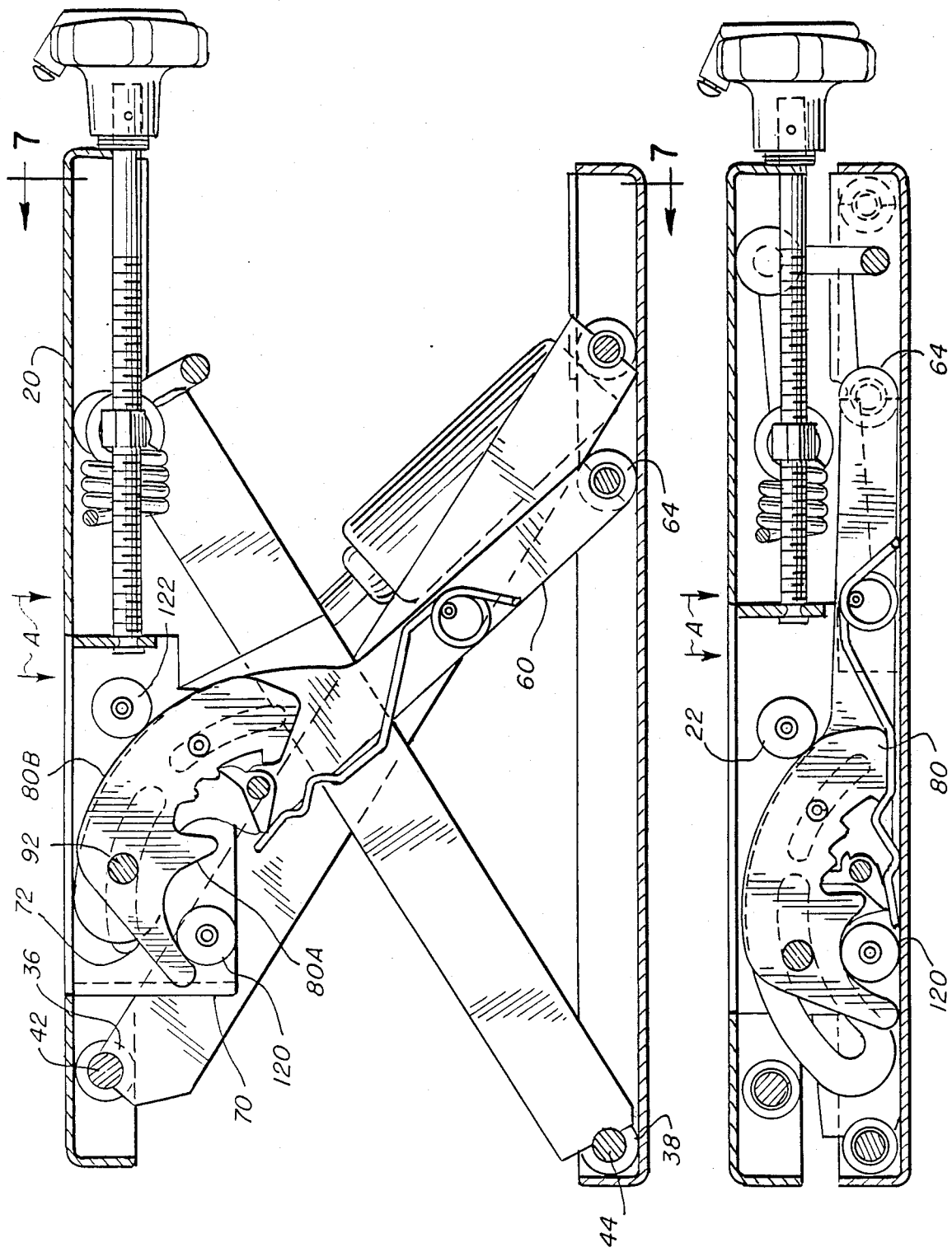

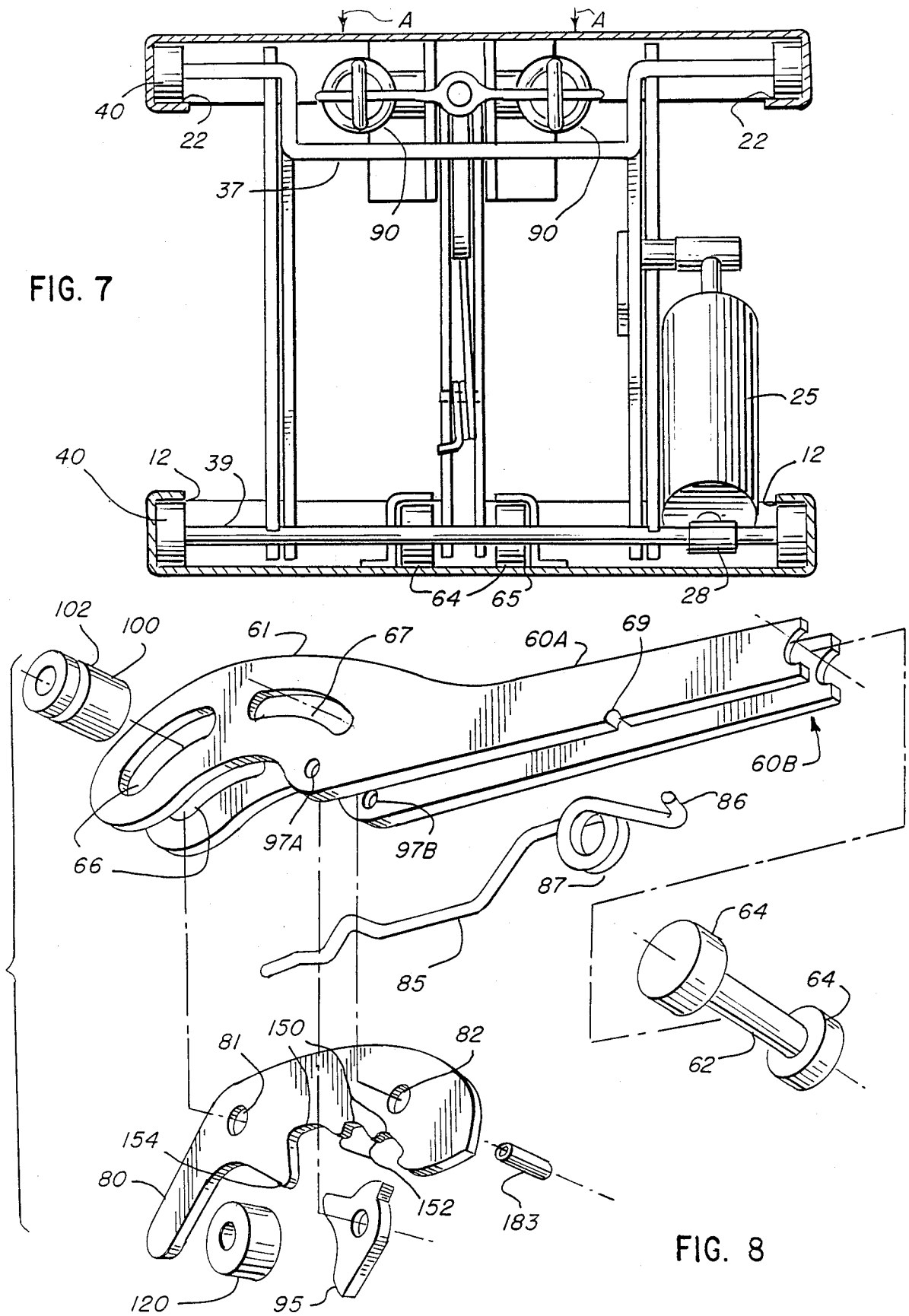

MECHANICAL SEAT SUSPENSION WITH CONCENTRIC CAM SURFACES

BACKGROUND OF THE INVENTION

The present invention relates to mechanical seat suspensions with a damping mechanism and a height adjustment feature, such as those typically used in trucks and construction and farming equipment.

There is a continuing need for suspension mechanisms that are simply constructed and inexpensive while still meeting manufacturers' ever increasing demands for compactness and comfort. An additional need exists for such a device whose suspension and ride characteristics can be easily modified.

Some seat suspensions have suspension damping means such as shock absorbers. These have created several problems. Most notably, the stroke of shock absorbers does not have a linear relationship to the vertical movement of the seat. The nonlinear relationship between the stroke of the shock absorber and the vertical movement of the seat diminishes the performance and ride characteristics of such a suspension device.

In addition, shock absorbers or other such fluid devices often have difficulty dissipating heat, especially when enclosed within a device where air circulation is not adequate. This causes both poor performance and a shorter life of the shock absorber.

Other difficulties have been encountered in the height adjustment mechanisms of seat suspensions. Frequently such mechanisms are difficult to reach, require levers or triggers that can pinch an operator, and generally are complicated and expensive. Furthermore, such mechanisms can be dangerous to operate when a vehicle is moving and the operator must grope or search for the adjustment mechanism.

Finally, most seat suspensions devices transmit the load from the seat to the suspension springs through steel bars comprising scissor arms or parallelogram linkages that carry virtually the entire load of the seat. These bars interact directly with the suspension springs. Thus, it has been necessary for all of those bars to be of substantial construction, thus increasing the cost and complexity of such devices. Typical of these prior art devices include the following U.S. Pat. Nos.: 3,339,906 to Persson; 3,826,457 to Huot de Longchamp; and 4,125,242 to Meiller et al.

SUMMARY OF THE INVENTION

The present invention provides a less expensive, more compact and comfortable seat suspension. It uses an independent operating support arm with a cam that moves about an imaginary pivot and a damping means that has a generally constant linear relationship to the vertical movement of the seat.

The suspension device disclosed herein is enclosed in a suspension housing. The actual suspension function is provided by the primary support means that is a support arm that pivots inside the housing. A secondary support for the suspension housing typically comprises parallel scissor arms that guide the vertical movement of the housing and sustain a lesser amount of the forces generated by a load on the seat suspension. This occurs because the suspension means, such as extensions springs, are directly connected to the support arm and are not connected to the scissor arms. A height adjustment means is part of the support arm. Attached to the secondary support—the scissor arms—is a damping means such as a shock absorber.

One of the objects of the present invention is to make a sturdy seat suspension capable of fitting the stringent dimensional constraints imposed by vehicle manufacturers. This is accomplished by the independence of the support arm from the scissor arms and a design which embodies an imaginary pivot defined by two arcuate surfaces on the cam at the end of the support arm. Another feature of the present invention is that it can be disassembled quickly and easily. Thus, the suspension and ride characteristics of the present invention can be easily modified by changing different suspension springs and shock absorbers.

Another object accomplished by this seat suspension is its comfortable ride. This is due to the physical independence of the suspension springs from the shock absorber. This feature of the present invention permits a generally constant linear relationship between the vertical movement of the seat and the stroke travel of the damping means. That in turn results in a more comfortable ride throughout the operational range of movement of the suspension.

In the preferred embodiment, the location of the shock absorber is outside of the scissor arms, where it can be exposed to more freely circulating air. Thus heat is dissipated from the shock absorber easily, permitting it to function more effectively and at the same time preventing it from wearing out as quickly as prior art devices.

The height adjustment mechanism is incorporated into the support arm and requires no lever, trigger, or other means for vertically adjusting the seat suspension device. Such features can be incorporated but sometimes are deemed undesirable. Adjustment is accomplished by pulling upwards on the top portion of the support housing, thus actuating a pivotable pawl and biasing spring that engage notches on the cam that establish various vertical positions.

DESCRIPTION OF THE DRAWINGS

The novel features which are believed to be characteristic of the invention are set forth in the appended claims. The invention itself, however, together with further objects and attendant advantages thereof, will be best understood by reference to the following description taken in connection with the accompanying drawings, in which:

FIG. 5 is a side view in partial cross section along line 5—5 of FIG. 4 and shows the invention at its highest adjusted position;

FIG. 6 is a side view in partial cross section, similar to FIG. 5, showing the mechanical seat suspension in its fully loaded or collapsed position with the imaginary pivot located outside of the device;

FIG. 7 is a cross section along line 7—7 of FIG. 5 showing the independent scissor arms and support arm inside the housing, with the shock absorber on the outside of one scissor arm;

FIG. 8 is an exploded view of the support arm showing in greater detail the cam and the height adjustment means;

DETAILED DESCRIPTION OF THE PREFERRED EMBODIMENT

Figure 1:
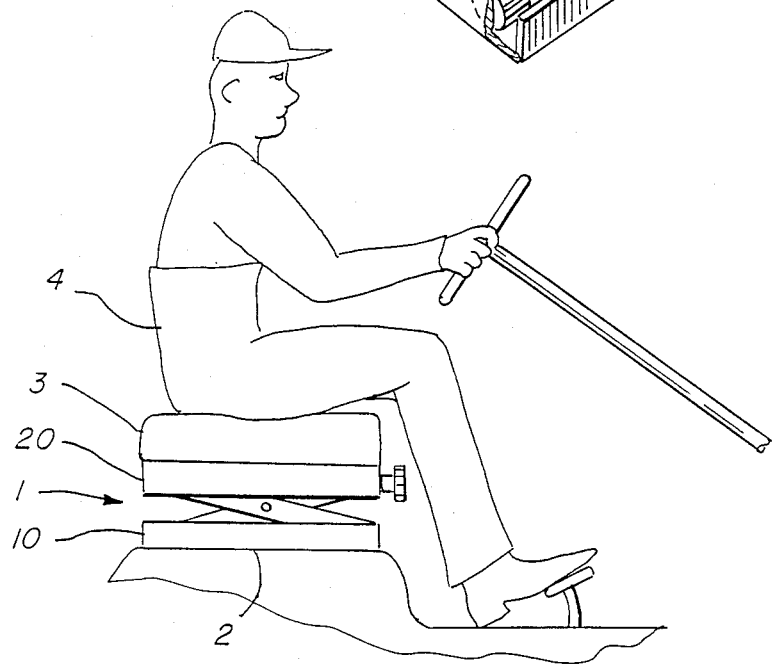
FIG. 1 depicts a driver sitting on a seat attached to the top of the mechanical seat suspension.

FIG. 1 generally depicts the mechanical seat suspension device 1. The device 1 is secured to a surface 2 in a vehicle (not shown) and can be covered by a seat 3 with pads or springs. The driver 4 sits upon the seat 3.

Figure 2:
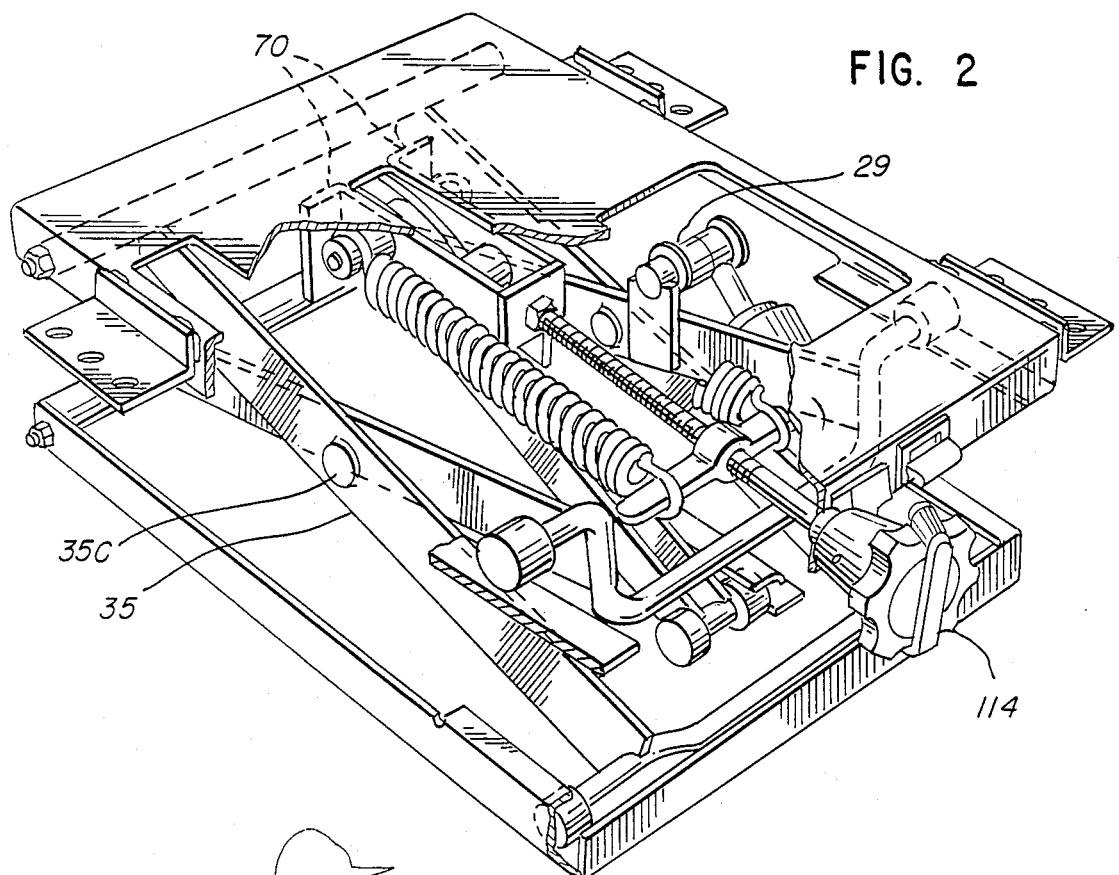
FIG. 2 is a perspective view of a mechanical seat suspension constructed in accordance with the present invention and with external parts broken away for better illustration.
Figure 3:
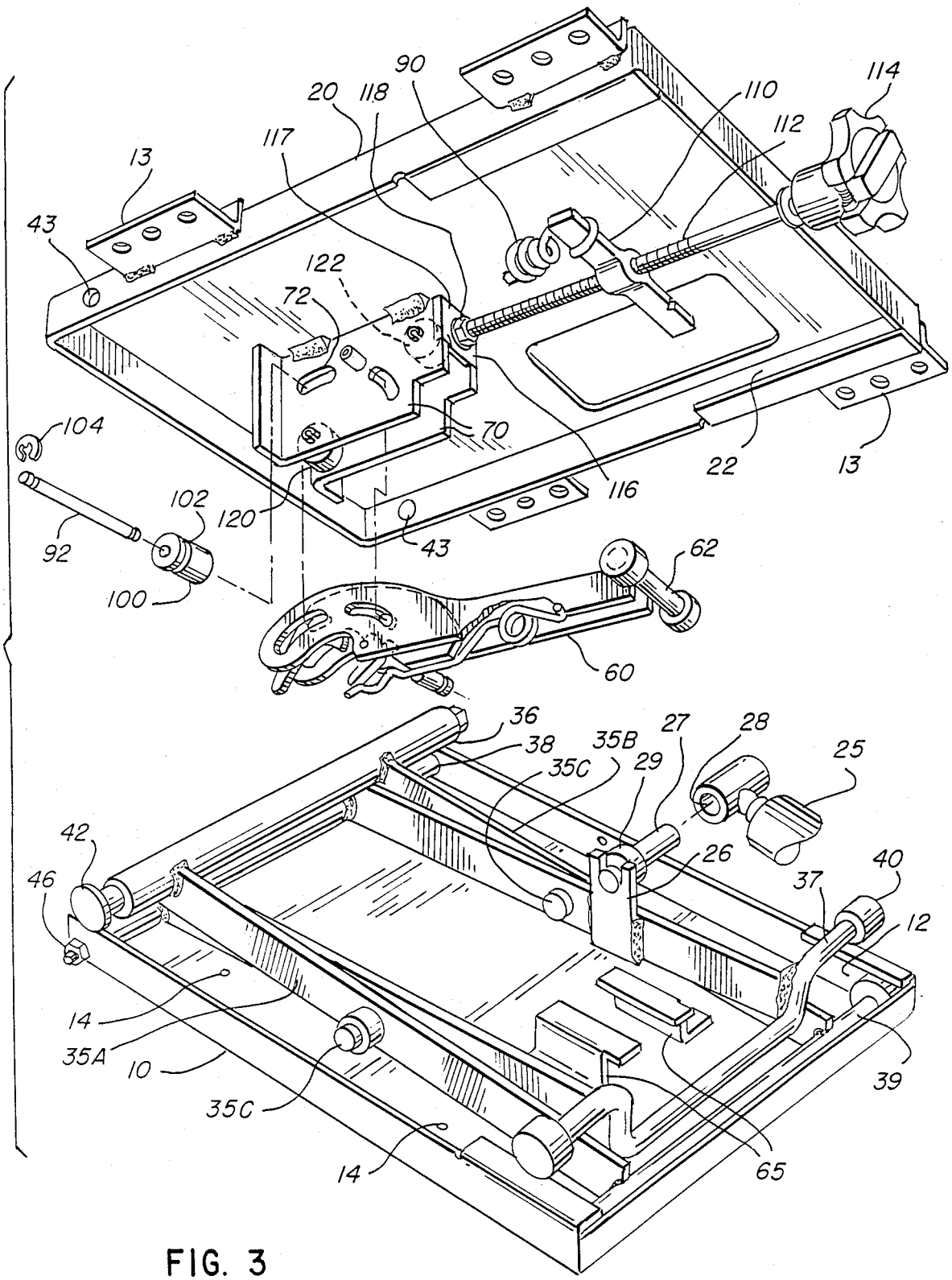
FIG. 3 is an exploded view of the present invention.

A general perspective of the present invention is shown in FIG. 2, while an exploded view of the device 1 is depicted in FIG. 3. Preliminarily the larger constituent parts of the device 1 will be discussed, after which the individual pieces will be examined in detail, and then the method of operation of the device 1 will be explained.

The housing for the device 1 consists of a lower portion 10 and upper portion 20. In this instance each portion is a solid plate with transversely bent or welded edges; however a substantial framelike structure would also perform satisfactorily. Connected to the housing are parallel pairs of scissor arms 35, each pair being denoted 35A and 35B respectively. One end of the scissor arms 35 is connected to the upper and lower housings 10, 20 by shaft bearing tubes 36 and 38 welded to scissor arms 35. Threaded shafts 42 and 44 pass through holes 43 at the ends of lower and upper housings 10, 20 and the bearing tubes 36, 38. These shafts are secured at one end by nuts 46 (one shown) placed outside the housing.

The other end of scissor arms 35 are welded to rods 37 and 39. These rods 37, 39 are covered by nylon roller tips 40 that roll in channels 12 and 22 of the lower and upper housings 10 and 20 respectively.

It can be seen from this configuration that the larger components of the device can be easily disassembled from a complete structure. By removing the nuts 46 from the ends of the threaded shafts 42 and 44, and then pulling the shafts 42, 44 free, the device will separate into the lower and upper housings 10, 20 and the scissor arms 35.

Other preferred features of the invention include ears 13 for attaching the upper housing 20 to a seat 3, and holes 14 for securing the lower housing 10 to a surface 2 in a vehicle. Also attached to the scissor arms 35 is the damping means, such as shock absorber 25. A dog 26 is welded to one of the scissor arms. Rod 27, attached to dog 26, passes though a journal 28 at one end of shock absorber 25 (FIG. 3). The other journal 28 of shock absorber 25 is pivotally engaged with rod 39 (FIG. 7). The journal ends 28 can be frictionally isolated from the scissor arm 35 by nylon or rubber washers 29 (FIG. 2).

When only the scissor arms 35 and the housings 10, 20 are assembled, there is no force to keep the upper and lower housings 20, 10 spaced apart, and thus without the shock absorber 25, just these pieces would collapse under their own weight. That is to say, there is no horizontal force opposing roller tips 40 from sliding in channels 12, 22. In the assembled device 1, housings 10, 20 are connected to and spaced apart by a support arm assembly generally indicated as 60. One end of the support arm 60 pivots in brackets 70 on the underside of upper housing 20 and is connected to suspension means including springs 90. The other end of the support arm assembly 60 is welded to a transverse rod 62 with nylon end tips 64. These end tips 64 roll in channels 65 composed of steel plates welded to lower housing 10.

The support arm assembly 60 is preferably comprised of two separate pieces 60A and 60B as shown in FIG. 8. The curved end of the support arm assembly 60 fits between brackets 70. A spring shaft 92 passes through bracket slots 72 and support arm slots 65. One set of ends of springs 90 is operatively connected to spring shaft 92. The other ends of springs 90 are ultimately secured against movement by indirect connection to the upper housing 20.

The general concept depicted thus far establishes the independent mechanical operation of the support arm 60 and the scissor arms 35. The support arm assembly 60 ultimately engages the suspension means, springs 90. The scissor arms independently interact with the damping means, shock absorber 25. When a load is placed on the device 1, the rounded ends 61 of support arm assembly 60 roll or pivot against the underside of upper housing 20, thus pulling on suspension springs 90. Simultaneously the motion of the springs 90 are damped by shock absorber 25.

Thus the pivoting support arm 60 is the primary support means of the device. The scissor arms 35 are a secondary support means that function mostly as a guide means for the vertical motion of the upper housing 20. A structural analysis f the entire assembly when loaded would disclose that the scissor arms 35 do transmit some vertical and horizontal components of force, but those components are relatively small in comparison with the load sustained by the support arm assembly 60. Consequently, the scissor arms can be constructed of a less substantial and less costly amount of material than prior art devices.

The support arm assembly 60 is shown in exploded view in FIG. 8. The assembly comprises the elements necessary to interact with the suspension means and the elements making up the means to adjust the height of the device 1. Cam 80 fits between pieces 60A and 60B. Spring shaft 92 passes through slots 66, pieces 60A and 60B, and hole 81 in cam 80 to secure one end of cam 80 inside the support arm 60. Pin 83 passes through slots 67 in pieces 60A and 60B and cam hole 82. Biasing spring 85 is pinned (not shown) through the coil 87 of spring 85 between pieces 60A and 60B with spring angle 86 fitting in notch 69. Pawl 95 is secured between 60A and 60B by pin 96 (FIG. 9) through holes 97A, 97B.

Figure 4:
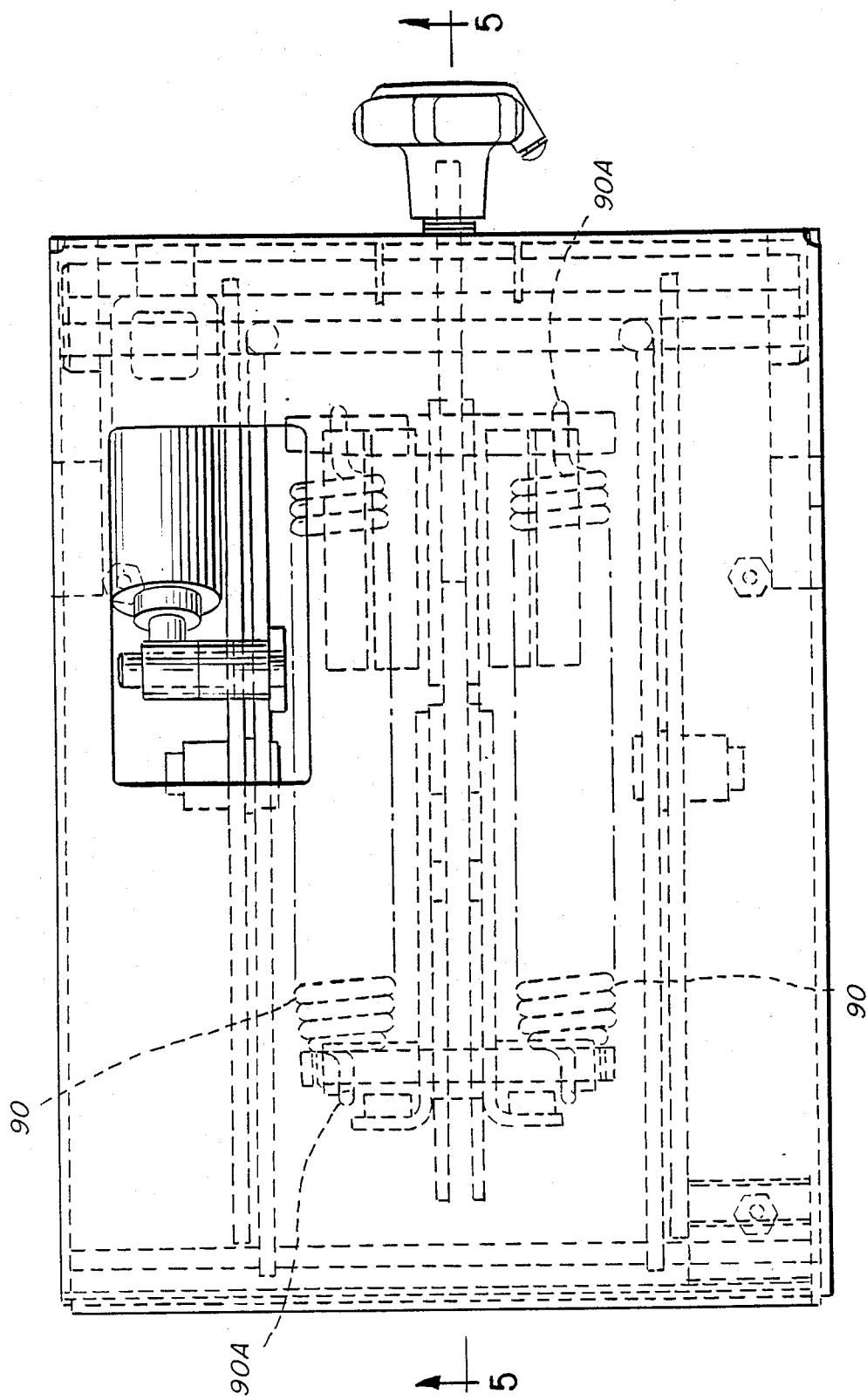
FIG. 4 is a plan view of the mechanical seat suspension.

On each outer side of support arm 60, spring end rollers 100 with circular notch 102 fit over each end of spring shaft 92 (FIG. 3). The rollers 100 are secured to the two ends of the shaft 92 by locking pins 104 (one shown). Springs 90 have curved ends 90A that fit in notch 102 (FIG. 4 in plan view). The ends of springs 90 connected to spring shaft 92 are moveable, as will be explained below. The fixed ends of springs 90 are curved ends 90A that loop over bar 110 that is part of the suspension spring adjustment mechanism.

As shown in FIG. 3, the spring adjustment mechanism consists of a threaded rod 112 threaded coupled to bar 110. The rod 112 extends through an aligning hole (not shown) in the upper housing 20. One end of the rod 112 is secured to a knob 114 outside of upper housing while the other end is threadably secured by washer 117 and nut 118 to plate 116 that abuts brackets 70. Consequently, when knob 114 turns threaded rod 112, bar 110 moves toward knob 114 or toward brackets 70. This adjusts the tension on springs 90. The force in the springs is ultimately transmitted to upper housing 20 by rod 112 and plate 116.

Figure 9:
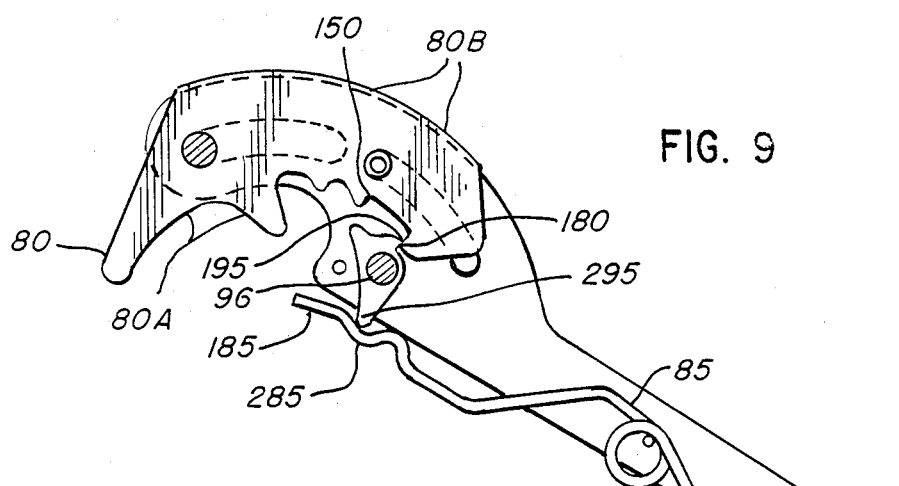
FIG. 9 depicts the height adjustment means in an unlatched position.

The functioning of the suspension system and its interaction with support arm 60 will now be described. One of the principal features of the device 1 is a so-called imaginary pivot that is the center of two concentric circles defined by arcuate surfaces 80A and 80B of cam 80 (FIG. 9). These surfaces are always in contact with cylindrical cam followers 120 and 122 that are secured inside brackets 70 (FIG. 3). Each cam follower is rotatable about a fixed axis. Referring to FIGS. 5-7, when a vertical force A is applied to the upper housing 20, the entire support arm assembly moves in a predetermined manner. Rollers 64 slide to the right (FIG. 5) in slots 65 (FIG. 7) and the left side of the support arm 60 and the cam 80 pivot counterclockwise (FIG. 5). This movement occurs because cam followers 120 and 122 are fixed relative to the position of brackets 70 and upper housing 20. Because springs 90 are connected to spring shaft 92, and fixed relative to upper housing 20 by bar 110, springs 90 pull the cam 80 and the cam end of support arm 60 to the right. The downward movement of the upper housing 20, however, causes a counterclockwise rotation to the cam 80 in opposition to force A. As the cam 80 moves, so too does the imaginary pivot move vertically through space.

A comparison of FIGS. 5 and 6 demonstrates the circular movement of the cam 80 relative to the fixed locations of cam followers 120, 122. From the highest adjustment of the device 1 as shown in FIG. 5, force A has caused the cam 80 to rotate counterclockwise to the device's lowest position in FIG. 6. At the same time, roller 64 of support arm 60 has moved further to the right, thus permitting the compression of the device 1. It should also be noted that slots 72 in brackets 70 define the same concentric arc as do cam surfaces 80A and 80B moving against cam followers 120, 122. Thus, spring shaft 92 follows the same arcuate motion of the cam 80. It should be noted that FIGS. 5 and 6 represent two different height adjustments of the device 1. As will become clear below, the height adjustment mechanism of the seat does not change when the device 1 is loaded. FIGS. 5 and 6 simply represent the two extreme configurations of the present invention.

FIG. 6 depicts the so-called imaginary pivot, which is defined by the intersecting radii of the arcs defined by cam surfaces 80A and 80B. The pivot is not fixed except with respect to the upper housing 20, and its location varies with the vertical movement of cam 80 and upper housing 20. As can be seen from FIG. 6, the imaginary pivot can be located outside the body of the device 1. This feature is responsible for the compactness of the present invention. In the present embodiment, the collapsed height in FIG. 6 is 3 inches, while the full height in FIG. 7 is approximately 9 inches.

Figure 12:
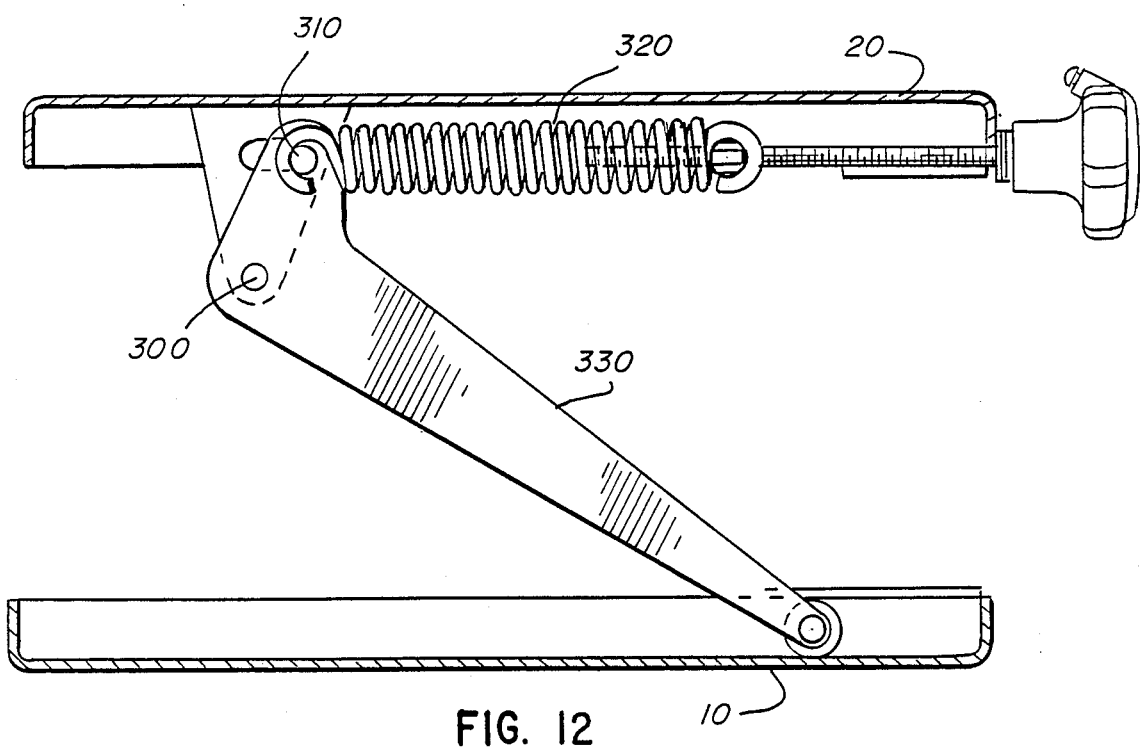
FIG. 12 shows part of an unsatisfactory device in a raised position.
Figure 13:
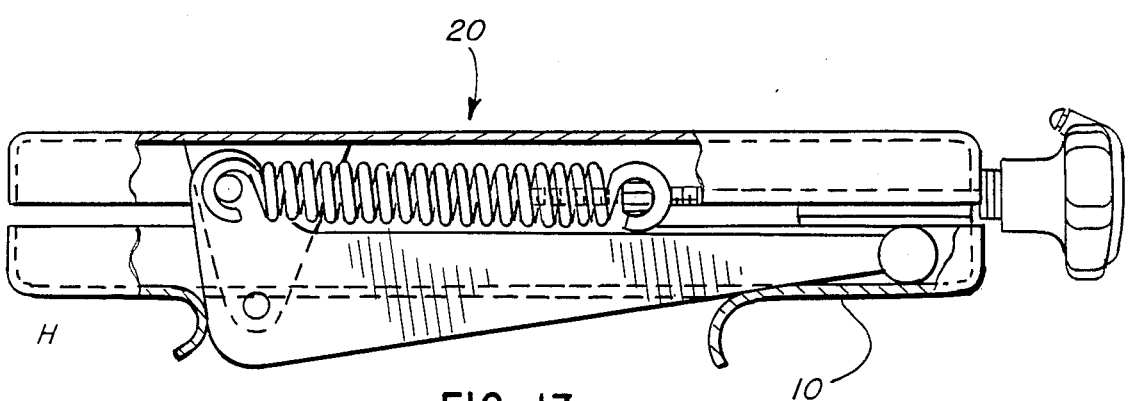
FIG. 13 shows the unsatisfactory device in an impossibly collapsed position.

FIGS. 12 and 13 show how a traditional configuration would require a greater height for the same device. To duplicate the performance of the present invention would require a scissor arm 330 with a force lever arm from pivot 300 to a point 310 collinear with spring 320. With this mechanical arrangement of FIG. 12, the completely collapsed configuration of FIG. 6 could not be achieved. This is demonstrated in FIG. 13, where the actual height H would be 5 inches, thus making it impossible to bring together upper and lower housings 20, 10. The few inches saved in the height of a mechanical seat suspension can mean the difference between meeting and not meeting the dimensional tolerances established by the equipment manufacturers who purchase such suspension devices. Traditionally the suspension of a device is determined by the lever ration, which represents the vertical displacement of the upper housing relative to the movement of the suspension spring. In the case of the present invention, the radii of curvature of the cam surfaces 80A and 80B are a result of the seat designer's predetermined choice of a lever ratio, which in the present device is 3.

The independence of the support arm 60 from shock absorber 25 not only permits a more efficient operation of each item, it also permits a generally constant linear relationship between the vertical travel of the upper housing 20 and shock absorber 25. This linearity results in a uniformity of performance of the seat, regardless of its load or height adjustment. The preferred ratio for the travel of the seat suspension to the stroke travel of the damping means is approximately 3:1.

The linear relationship between the upper housing 20 and the shock absorber 25 should not vary from complete linearity by more than 10 percent. This is because the two ends of the shock absorber move in a substantially linear relationship to each other as the scissor arms move. In the prior art devices, the shock absorber would be attached to the upper and lower housings. This would result in arcuate, non-linear motion, and thus the vertical component of the force applied to the shock absorber would diminish as the vertical height of the suspension decreased. Here the force in the shock absorber 25 is independent (within 10 percent) of the height of the seat, and is determined only by the load on the seat.

The height of the dog 26 determines the length of stroke of the shock absorber 25. A maximum amount of stroke for the shock is desirable. The further away from the scissor arms pivot 35C the rod 27 is, the greater will be the stroke of the shock absorber 25. This in turn will lower the ratio between the displacement of the upper housing 20 and the shock 25. One of ordinary skill in the art will appreciate that it is not necessary for the lever ratio and shock ratio to be identical, and that such features are a result of the design requirements for a particular suspension device.

Figure 10:
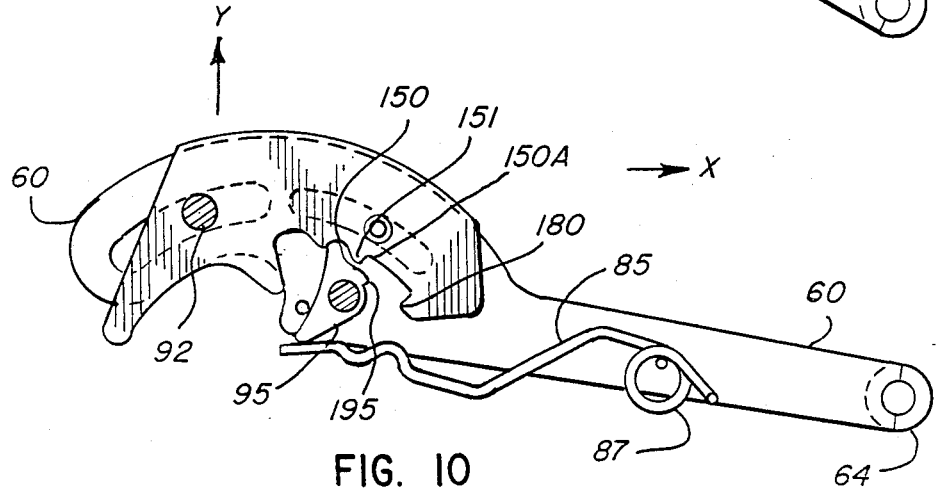
FIG. 10 depicts the height adjustment means latched in an intermediate position.
Figure 11:
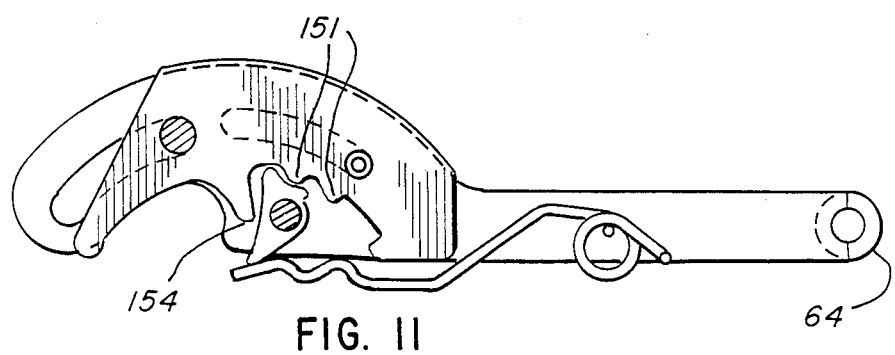
FIG. 11 shows the height adjustment means reengaged in a first latched position.

FIGS. 9, 10, and 11 depict the operation of the height adjustment means. In general, biasing spring 85 urges pawl 95 into locked engagement with one of a plurality of notches 150 on cam 80. The notches 150 are defined by a plurality of teeth 152 and pawl engaging tooth 154. The described embodiment of the present invention uses three notches, each representing a different height adjustment. Fewer or more notches can be used, and the disclosure of three height adjustments is merely by way of example.

FIG. 10 depicts the adjustment means at its intermediate height. Arrow X designates the force of springs 90 which, coupled with the biasing force from spring 85, maintains the tip of pawl 95 engaged with notch 150. To raise the height of the device 1 requires the application of a vertical force Y on spring shaft 92, which can be accomplished by an upward force exerted on upper housing 20 (not shown). This causes support arm 60 to pivot clockwise. Rollers 64 in channels 65 move to the left while the vertical force Y pulls the support arm 60 and cam 80 upward. This releases the locking force engaging pawl 95 and notch 150 so that as cam 80 is pulled upward pawl 95 slides over the tip of tooth 151 and into the adjacent right hand notch 150A (FIG. 10).

In the described embodiment, notch 150A represents the highest height adjustment. To lower the height of the device 1, additional vertical force is applied to the support arm 60 and cam 80 until pawl disengaging edge 195 contacts cam disengaging edge 180. As more upward force is applied pawl 95 pivots about pin 96. Thus the tip 295 of pawl 95 that contacts spring 85 moves from the tip 185 of spring 85 into notch 285. The tip of pawl 95 that engages notches 150 is moved beyond the arc that circumscribes teeth 151, and the height adjustment means is completely disengaged. The latch means of the claimed invention includes pawl 95, notches 150, teeth 151 and spring 85.

Reengagement of the height adjustment means requires a downward force to be applied to support arm 60 and cam 80. This is done by pushing down on the upper housing 20 (not shown FIGS. 9-11), which rotates the support arm 60 counterclockwise as rollers 64 move to the right. This motion eventually causes the tip of pawl 95 to contact pawl engaging tooth 154, which is larger than teeth 151. When contact is first made tip 295 is still held in notch 285. Further downward force causes pawl 95 to pivot about pin 96 so pawl tip 295 is relocated to spring tip 185. This arrangement is depicted in FIG. 11, which shows the height adjustment means engaged in its first, or lowest, position.

It is important to note that the geometry of the biasing spring 85 and pawl 95 has a special configuration and purpose. When the height adjustment means is in any of the three positions, or anywhere in between, rear pawl tip 295 is always located at biasing spring tip 185 and being urged into engagement with notches 150. When the pawl 95 has become completely disengaged, as shown in FIG. 9, notch 285 urges pivotable pawl 95 to remain in continual disengagement, outside the arc of teeth 151, until reengaging tooth 154 engages pawl 95 into the first position. The detent means of pawl disengaging edge 195 and cam disengaging edge 180, by causing the rotation of the pawl 95, locates the pawl tip 295 with respect to spring tip 185 or spring notch 285.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims:

What is claimed is:

1. An adjustable seat suspension comprising:
a moveable suspension housing;
a support arm assembly, pivotable within said housing, comprising a cam and a height adjustment means, said cam including two concentric arcuate surfaces having a center point about which said cam pivots;
parallel pairs of scissor arms connected to said housing;
resilient suspension means operatively connected to said support arm assembly; and
damping means connected to said scissor arms, said damping means being movable in a generally constant linear relationship to the movement of said suspension housing.

2. The apparatus of claim 1 wherein said cam pivoting is limited by cam follower means.

3. The apparatus of claim 1 wherein said damping means further includes means for limiting the stroke of said damping means to a distance approximately one-third of the movement of said suspension housing.

4. The apparatus of claim 3 wherein said height adjustment means comprises a pawl and a biasing spring for selectively engaging and disengaging said cam.

5. An adjustable seat suspension comprising:
a moveable suspension housing comprising an upper portion and a lower portion;
parallel pairs of scissor arms hingedly connected to one end of both the upper and lower portions of said housing;
a shock absorber attached to said scissor arms wherein said shock absorber has a stroke that remains in a generally constant linear relationship with the movement of the upper portion of said suspension housing;
a support arm assembly for carrying the major portion of a load applied to said adjustable seat suspension, in contact with and pivotable between said upper and lower portions of said housing, comprising a cam held in pivotable position by cam follower means and further comprising latch means in operative cooperation with said cam for effecting height adjustment; and
springs operatively connected to said cam.

6. The apparatus of claim 5 further comprising slotted plates attached to said upper housing for guiding the pivoting of said support arm assembly.

7. The apparatus of claim 6 wherein said cam follower means is located between said slotted plates.

8. The apparatus of claim 7 further comprising a spring shaft that passes through said cam and said slotted plates and is connected to one end of said springs.

9. The apparatus of claim 8 further comprising means for adjusting said springs.

10. The apparatus of claim 5 wherein said cam comprises two arcuate surfaces each in contact with said cam follower means.

11. The apparatus of claim 10 wherein said two arcuate surfaces are concentric and define a center pivot point.

12. The apparatus of claim 11 wherein said latch means further comprises a biasing spring that exerts a locking force upon a pivotable pawl that is selectively engageable with notches in said cam.

* * * * *